United States Patent

[11] 3,624,298

| [72] | Inventors | Arthur C. Davis<br>Newport Beach;<br>Donald B. Davis, Tustin; James J. Noble,<br>Santa Ana, all of Calif. |
|---|---|---|
| [21] | Appl. No. | 804,573 |
| [22] | Filed | Mar. 5, 1969 |
| [45] | Patented | Nov. 30, 1971 |
| [73] | Assignee | LTV Ling Altec, Inc.<br>Anaheim, Calif. |

[54] SOUND-IMPROVING MEANS AND METHOD
18 Claims, 13 Drawing Figs.

[52] U.S. Cl. .................................................... 179/1 D,
179/1 FS, 333/28
[51] Int. Cl. ........................................................ H03j 5/24
[50] Field of Search............................................ 179/1.2,
170.2, 1 D, 1 F, 1 FS; 325/12; 333/76, 28 T

[56] References Cited
UNITED STATES PATENTS
2,682,037  6/1954  Bobis............................. 333/76

2,742,615  4/1956  Preisig........................... 333/76
3,256,391  6/1966  Boner............................. 179/1 FBS OTHER REFERENCES
Electronics World, Tailor Your Loudspeaker to Your Room, Augspurger, Jan. 1961

*Primary Examiner*—Kathleen H. Claffy
*Assistant Examiner*—Jon Bradford Leaheey
*Attorneys*—James J. Nelson and Sokolski and Wohlgemuth ABSTRACT: A method for eliminating undesired effects produced by reverberations from structure on the quality of sound produced by a sound system which is operated in association with the structure by smoothing the sound pressure-level versus frequency characteristics of the sound; and apparatus for practicing the method in the form of a filter network for use in combination with the sound system whereby electrical signals are attenuated by different amounts within selected ones of discrete bands of audiofrequencies to shape the sound pressure-level versus frequency characteristic of the sound.

FIG 1

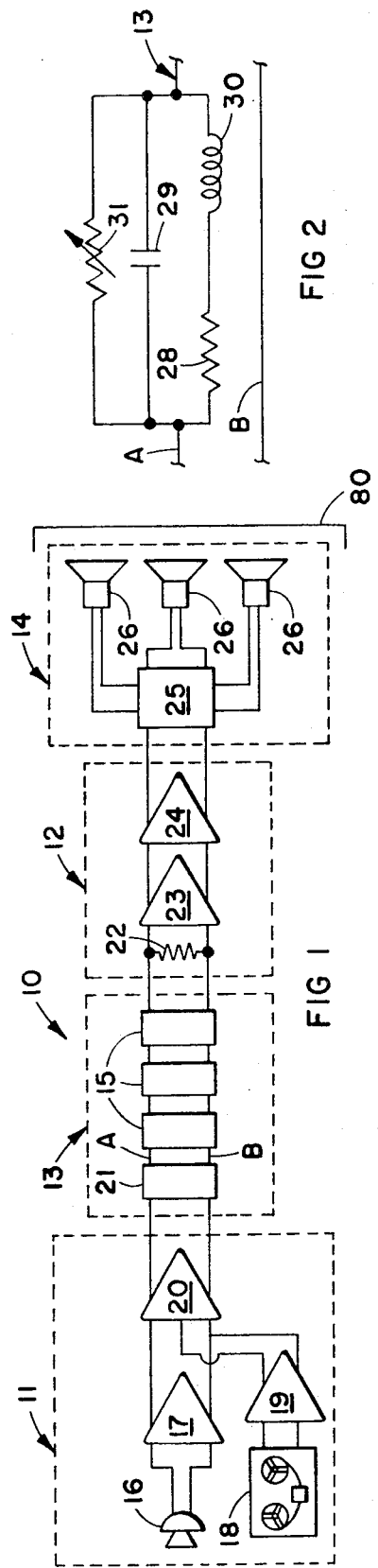

ARTHUR C. DAVIS
DONALD B. DAVIS
JAMES J. NOBLE
INVENTORS

BY *J. K. Goldwire*

ATTORNEY

ARTHUR C. DAVIS
DONALD B. DAVIS
JAMES J. NOBLE
INVENTORS

BY *J. H. C. Baldwin*
ATTORNEY

SOUND-IMPROVING MEANS AND METHOD

This invention relates to improvements in electrical sound systems and the like and more particularly to means for adjusting the sound pressure-level versus frequency characteristic of sound produced by such a system to improve the quality of the sound and to a method for effecting the adjustment.

Electrical sound systems may be classified into two general categories: sound reinforcement systems and sound playback systems. A sound reinforcement system includes a microphone as a signal source, which microphone converts acoustical energy into electrical signals for transmission, through a linking circuit, to an amplifier where a power increase is accomplished before the signal is fed into and reconverted to acoustical form by a speaker system. The playback system is electrically similar to the reinforcement system except that the source of the electrical signal is typically a stylus, in the case of material recorded on a record, or a playback head, in the case of material recorded on magnetic tape; or the signal source may be a radio or other receiver, such as (for example) an AM or FM tuner. Additionally, the signal source often includes at least one preamplification device to render the signal suitable for transfer into the linking circuit. As in the reinforcement system, the linking circuit of the playback system links the signal source and the power amplifier. It is known that certain devices may be used to operate on the electrical signals in the linking circuit to modify the acoustical output of the system. For instance, broadband filters have been used to attenuate signals within large portions of the audiofrequency spectrum to vary, for example, the intensities of sounds in the high-frequency portions of the sound material. A similar, broadband filter has been used to attenuate low frequency sound, and both high and low frequency filters are commonly used in high fidelity sound systems to enable a listener to adjust the sound intensities within treble and bass ranges to suit his particular taste. These filters, commonly known as "rolloff" filters, are useful in either sound reinforcement or playback systems.

When a sound system having a sound-reproducing output device, such as a loudspeaker, operates in the presence of other structure, as when operated in a room, the structure normally reflects some of the sound and (depending upon the materials from which the structure is made, the spacings between items of the structure and the reproducing output device, and other, related factors) resonances are established in the room at certain fundamental frequencies and harmonics thereof. The sound waves undergoing resonance interact with sound waves continuing to be transmitted by the output device and, as a result of the interaction, deteriorate the quality and fidelity of the sound, as perceived by a listener. In other words, the sound transmitted from the output device is distorted from its original form and its original fidelity is impaired by its interaction with the reflected sound. Such distortion has been regarded as a narrow-band phenomenon, occurring only at discrete frequencies of resonance and harmonics thereof at which the pressure-levels of sounds are increased or decreased, depending upon whether reflected sound waves happen to add to or cancel energy in sound waves transmitted from the output device. The sound in the room, therefore, includes sound waves transmitted from the output device and acted on or modified by sound waves in a state of resonance. Even though the problem of distortion arising from this phenomenon is well known, there have been no satisfactorily successful attempts to overcome it. Vast sums of money are expended by equipment manufacturers to design and manufacture high fidelity sound systems which are capable of reproducing sound virtually in its natural state, and still greater sums are spent by purchasers of the systems accordingly manufactured; in spite of this, however, it is discouragingly true that a substantial percentage of the fidelity with which sound is produced by such systems is destroyed before it reaches the ear of a listener.

A related problem has been the feedback of energy from the reflected sound waves into the microphone of a sound reinforcement system; a familiar example is the "screech" or "howl" often heard in conjunction with the use of a public address system and essentially occasioned (neglecting peaks in microphone-frequency response) by regenerative feedback between the microphone and the sound in the room at one or more frequencies where an excessive room resonance occurs. In an attempt to eliminate regenerative feedback causing system oscillation, the linking circuits of reinforcement systems have been provided with filters designed to attenuate the electrical signals at discrete, offending frequencies sufficiently to keep the corresponding sound pressure-levels below the threshold of oscillation. Because oscillations attributable to regenerative feedback have been understood, though not entirely correctly, as caused by excessive energies each having a single frequency, only narrowband, band-rejection filters have been used to attenuate the power of the electrical signals at each single, offending frequency to reduce the sound pressure-level at that frequency. By reducing the pressure level of sound at a specific frequency, the acoustical coupling is reduced and the likelihood of an occurrence of regenerative feedback at that frequency is accordingly lessened. Each room may have many frequencies of resonance, and the elimination of feedback can rarely be accomplished by the reduction of the sound pressure-level produced by only one frequency; depending the size and the other characteristics of a room, it is not uncommon to have as many as 30 to 100 separate resonance-points, within the audio spectrum, where feedback can occur. A typical procedure is to filter each offending frequency successively, beginning with the worst one, until the system does not prematurely break into oscillation at any point in the audioband as the system gain is increased to a practical maximum. Typically, a narrowband, LC, antiresonant filter is used to accomplish the attenuation at each offending frequency, and each filter includes a multitapped, toroidal inductor. By selecting one or the other of the taps for connection of the inductor in a lead of the linking circuit, there may be varied the amount of attenuation inserted by the filter at a given frequency. Use of an LC filter of the type described is accompanied by a considerable penalty in the form of a substantial power loss, for it creates an unbalanced condition in the linking circuit, especially where (as is usually the case) several filters are used in series. Practioners have discovered that, as a discrete frequency is filtered in this manner, additional and seemingly related offending frequencies appear and must also be filtered; consequently, the cure for what initially appears to be one problem eventually requires the insertion of several filters. It is known that at least one additional resonance point (thus, at least one additional, potential, feedback frequency) often appears within a comparitively few cycles of the originally offending frequency. Unfortunately, each potential oscillation mode beyond the first must be identified and dealt with as above. Utilizing known techniques, this is a laborious, time-consuming, and expensive process; lesser oscillating modes often must be eliminated before the principally offending modes can be located, and it is quite difficult for even a technician with an excellently trained ear, to avoid the mistake of selecting, for attenuation, a harmonic rather than the fundamental of the actually offending frequency. Additionally, the electrical connection, painstaking tuning, and adjustment of the attenuation of each filter is, of itself, a major task that consumes a representative average of 30 minutes per coil. It is apparent, therefore, that it may take days to tune a sound system for use in, for example, an auditorium, and the time and expense involved make tuning impractical for many installations. Prior techniques for use in eliminating regenerative feedback are limited in their application to use in sound reinforcement systems, for there generally is no acoustical coupling in a good-quality playback system which might cause system oscillation from regenerative feedback. Furthermore, prior methods and devices for eliminating regenerative feedback in a reinforcement system improve the quality of sound only to the extent of eliminating feedback-induced oscillations; sound pressure-level distortions not causing system oscillations remain in the sound, uncorrected.

The use of narrowband filters in efforts to end feedback-induced oscillations itself creates yet another problem: the use of such filters results in the introduction of spurious signals into the linking circuit. Energy transferred by a linking circuit toward a filter stimulates oscillations of the frequency of resonance of the filter, and these oscillations gradually decrease in amplitude over a given time which depends on the degree of selectivity of the filter. This phenomenon is often referred to as "ringing." The sharper the filter selectivity (the more selectively a single frequency is attenuated), the longer the decay time of the reflected oscillation; and oscillations of sufficient amplitude and having a decay time of the order of 20 milliseconds and longer are audible and cause additional distortion which is present, at the very outset, in the output of the reproducing device. For this reason, it is not desirable to use narrowband filters in the linking circuit.

From the above, it will be apparent that a method and apparatus are required which will be effective beyond the state of the art to eliminate the undesirable effects of resonances upon sound in a room, regardless of whether the sound system is of the reinforcement or playback type. Simplified, economical, and more accurate techniques and more effective equipment are required which will be useful to eliminate undesirable room-effects on sound produced by either a playback system or a sound reinforcement system.

Accordingly, a major object of this invention is to provide an improved sound system.

Another object of this invention is to provide a method for improving the quality of sound produced by a sound system operating in association with structure, which sound has interaction with sound reflected by the structure.

A further object is to provide an electrical filter network for use with a sound system to enable the quick and accurate practice of the method for improving the quality of sound.

Yet another object is to provide an electrical filter network for implementing the method for improving the quality of sound, which filter network presents a constant impedance, regardless of the number of filters used in its construction.

A still further object is to provide a filter network for use with a sound system to improve the quality of sound, which filter network operates without introducing spurious signals into the output of the sound system.

Still another object is to provide a method for tuning a sound system to a room to eliminate undesired effects of the room on the sound.

An additional object is to provide a sound system which reproduces sound in the presence of structure, which sound system is capable of a high acoustical gain, wide and uniform acoustical frequency response, and reduced distortion arising from effects of the structure on the sound.

Other objects and advantages will be apparent from the specification and claims and from the accompanying drawing illustrative of the invention.

In the drawing:

FIG. 1 is a schematic representation of the improved sound system of this invention;

FIGS. 2, 3, and 4 are schematic drawings of each of three filters for use in the filter network of this invention;

Figure 5:
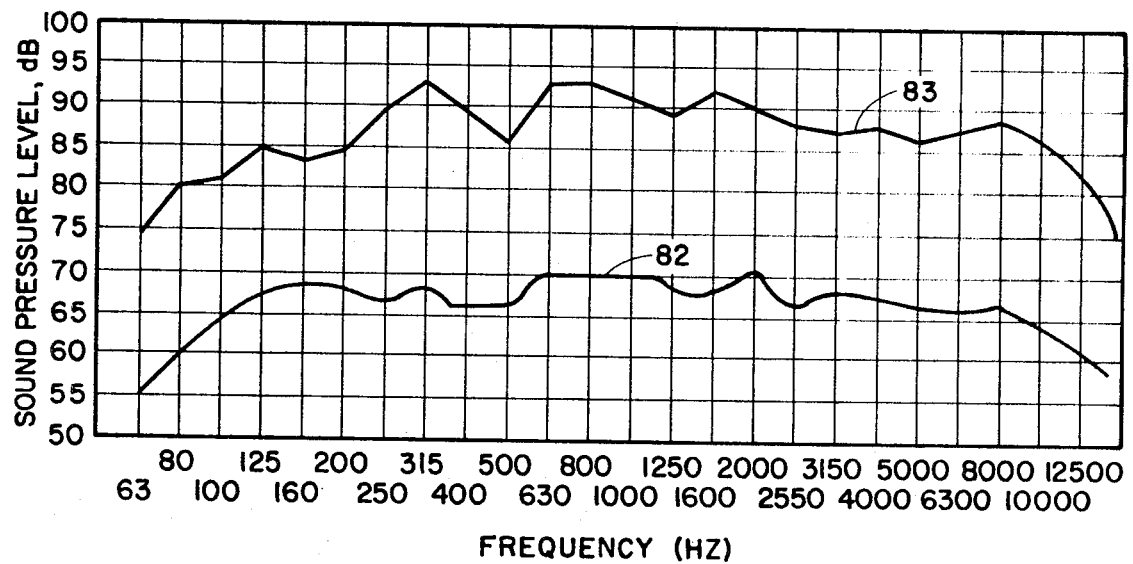
FIG. 5 is a graph illustrating undesired distortion in the sound in a room.

Refer to FIG. 1. The sound system 10 includes a signal source 11 and amplifying means 12 connected to each other by a linking circuit 13 comprising at least two conductive paths A and B. The signal source 11 includes either a microphone 16 and its associated preamplifier 17 and/or some other signal-generating device, such as a tape deck 18 and preamplifier 19, to provide an input signal to the sound system; other input devices and configurations, of course, may be used. In addition, the signal source 11 may also include a mixer-amplifier 20 capable of selecting, by switching, any one of a plurality of signal inputs from the various signal-generating devices provided. In the linking circuit 13, broadband or "rolloff" filters such as 21 may be included, and the broadband filters may be either bass or treble filters or a combination of the two. The electrically conductive paths A, B of the linking circuit 13 are two metal or other conductors (e.g., an earth ground). Typically, the impedance of the linking circuit 13 is established at a fixed value, for instance 600 ohms, and the input impedance of the amplifying means 12 is adjusted to match the linking circuit impedance in order to present a proper balance with the linking circuit and thus to reduce transmission losses. A terminating resistor 22 is provided at the amplifying means 12 for this purpose and is connected across the linking circuit 13. Where the losses in the linking circuit 13 are sufficient, the amplifying means 12 includes a line amplifier 23 in addition to a power amplifier 24, and the line amplifier is useful to restore insertion losses, as where there are several filters 15, 21 inserted into the linking circuit. Electrical signals from the amplifying means 12 are converted into sound waves by a sound-reproducing device 14 which, for example, includes a crossover network 25 which serves to distribute electrical signals, depending upon the frequencies thereof, among speakers 26 to provide efficient reproduction. It will be apparent that many sound system components could be substituted for or added to the configuration shown without departing from the scope of this invention, and the arrangement of the components shown can be altered.

When the sound-reproducing device 14 is operated in association with a structure 80, which may be the walls, floor, and ceiling of a room (or simply operated in association with a freestanding wall), the sound waves reproduced by the device 14 are reflected and interact with subsequently reproduced sound waves. Where the structure permits, as is ordinarily the case, multiple reflections create resonances at many frequency-bands in the audio spectrum. The net effect is that sound that would be produced by the reproduction device 14 if operated in an anechoic chamber is distorted by changes in energy in the sound within bands centered about a number of frequencies and caused by the resonances induced by the room. These energy-changes reduce the quality of the sound in the room below its potential. The reduction in quality springs from a balance of pressure-levels in the sound reaching a listener which is distorted when compared with pressure-levels originally present in the sound sought to be reproduced. This phenomenon is illustrated in FIG. 5, wherein the curve 82 represents the output of a given loudspeaker in an anechoic chamber (sound pressure-level vs. frequency across the audiofrequency spectrum) and curve 83 represents similar data plotted for the same loudspeaker when operated in a room. The differences in the contours of the curves represent the effects of room resonances on the sound in the room. Interpretation of FIG. 5 results in the information that, when the system gain employed for producing the data of curve 82 is increased to equal the gain employed when producing the sound from which the data of curve 83 are derived, curve 82 is 6 db. below curve 83 at 315 Hz. Coupling between the sound and the sound system itself produces, on occasion, distortion of the sound pressure-level curve 83 which is manifested in the form of regenerative feedback. On occasion, the sound system itself introduces distortions of the sound pressure-level curve by producing spurious signals which appear in the system output.

For eliminating the undesired effects produced by reverberations from structure 80 on the quality of sound produced by the system 10 (FIG. 1), the system is equipped with a plurality of electrical filters 15 located in the linking circuit 13 and each tuned to attenuate signals within a band extending on each side of its respective center frequency, the center frequencies of the respective filters being substantially equally spaced across at least a portion of the audiofrequency spectrum. Each filter 15 or combination of such filters has a specified bandwidth to be described. In a preferred embodiment, there are 24 filters 15 which are spaced one-third octave apart from 63 to 12,500 Hz. and with the first filter constructed to have a center frequency of 63 Hz. and the center frequency of the 24th filter being 12,500 Hz. The respective filters 15 may be active or passive filters, and each filter incorporates means for varying the attenuation of electrical signals thereby.

Figure 7:
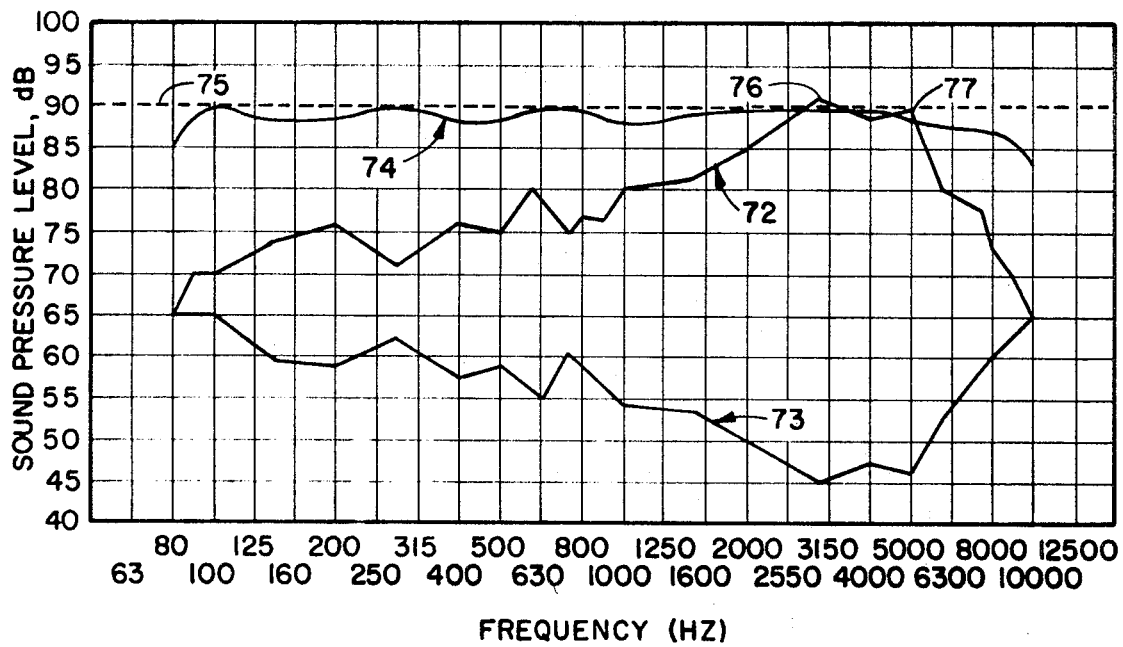
FIG. 7 is a graph showing the acoustical response of sound in a room before and after the application of the apparatus and method of this invention and the electrical response necessary to accomplish the acoustical response.

An important feature of this invention is the elimination, in a quick, accurate, and economical manner, of the undesired effects produced by resonances induced by structure on the quality of sound produced by a system which is operated in association with the structure and which has a signal source, amplifying means, a linking circuit connecting the signal source and amplifying means, and a sound-reproducing device driven by the amplifying means. A plurality of electrical filters is inserted into the linking circuit 13 and the attenuation of each respective filter is adjusted to shape a total electrical filter-rsponse curve (db. v-frequency) which is substantially the inverse of the combined acoustic response curve of the room, the electronics, and the signal source. This concept is illustrated in FIG. 7, where curve 72 shows distortions in the response-curve produced by operating a sound-reproducing device in a room. Curve 73 illustrates the response curve of the plurality of electrical filters 15 (FIG. 1), and curve 74 represents the resultant response-curve of the sound audible in the room upon insertion of the filters into the linking circuit 13. Note that a profound improvement is made in the sound pressure-level throughout the audiofrequency spectrum.

Having accomplished a response for sound in the room equivalent to that illustrated by curve 74, several improvements in the quality of sound in the room have been achieved. First, assume that the line 75 represents a sound-pressure level at the threshold of oscillation of a sound-reinforcing system. When the gain of the system is increased until energy in the sound exceeds this threshold, as it does in the illustration at peak 76 in curve 72, the sound-reinforcing system will break into oscillation from regenerative feedback. The sound pressure-level versus frequency characteristics of the system as operated in the room having been smoothed as shown in curve 74, however, the likelihood of such oscillation is substantially reduced.

Next (and this concept applies to playback systems as well as reinforcement systems), energy within the sound in the room (curve 74) is more evenly distributed across all frequencies, with the result that the energy of certain frequencies or bands of frequencies is not enhanced simply because of the effect of room resonances; hence, the fidelity of the sound is preserved, for the relative energies of frequencies and loudnesses of tones present in the originally created sound is substantially reproduced.

Further, what may be called the useful loudness of the system is improved. Assume that a sound reinforcement system is operating to produce, in a room, a sound-response curve such as 72 and that the gain of the system is increased until an energy peak, such as 76, exceeds the threshold of regenerative feedback 75. In this event, the sound system will break into oscillation at a single frequency located near the apex of the peak. In the past, a narrow-band filter has been used to attenuate electrical signals of the oscillating frequency in the linking circuit and thereby eliminate the feedback; however, such attenuation does not act to bring down the energy in the peak 76, which has excessive energies throughout the band of frequencies extending from 2,550 to beyond 3,150 Hz. Oscillation occurred in the first place because, in attempting to obtain an adequate loudness of the sound in the room, a listener increased the system gain until, before sufficient loudness was attained, the peak 76 rose over the threshold 75. Having removed the tip of the peak by insertion of a narrow-band filter, oscillation is stopped, but the energy-levels in the portions of peak 76 not affected by the narrowband filter are unchanged. Resuming an attempt to obtain a desired loudness of sound, the listener seeks to increase system gain beyond the point at which feedback-induced oscillation first occurred, only to find that stopping the first oscillation produced practically no increase in useable system gain; for an unaltered portion of peak 76 is quickly raised above the threshold 75 and oscillation at a second frequency near the first is the result. The present invention removes energy peaks such as 76 or 77 substantially as a whole, thus making possible a close approach of all the output frequencies of the system to the oscillation threshold. Thus, the overall, useable gain of the system is sharply increased.

Additionally, distortion of sound coloration is reduced where sound balance is restored. Such distortion of coloration occurs where the gain of the system is adjusted to a point where the energy in the sound at a certain frequency or band of frequencies is near, but has not exceeded, the threshold of oscillation. Tests have shown that the decay time of the sound at such a frequency is extended, for some regeneration is experienced before the system actually breaks into self-sustaining oscillation. Since the decay times of sounds at certain frequencies are thus extended, the sound is falsely colored by the presence of these frequencies in amplitudes not present in the original material. When the natural balance has been restored, this difficulty is eliminated, even the overall output of the system is near the threshold of oscillation.

It is emphasized that the method of this invention removes no useable material; rather, it brings into equality, with the majority of the frequencies, those special frequencies that the room and the sound system together actually overemphasize. The method disclosed herein provides consistently and precisely repeatable results not heretofore achieved.

Improvement of the audible sound produced by the system is accomplished by measuring the sound pressure-level versus frequency characteristic of sound associated with the sound system output and acted on by resonances induced by the structure to locate the frequencies of sound pressure-level distortions with respect to the theoretical, undistorted output of the system. This characteristic, called hereafter the "house-curve," may easily be measured by using an audio oscillator and a meter for reading sound pressure level; the preferred method for taking the measurement, however, requires the use of a random-noise generator and a wave analyzer with ⅓-octave band-pass filter portions covering the audio spectrum, such as a General Radio 1564A, all used in conjunction with the sound system. The random-noise generator output is fed into the input of the sound system and is filtered to pass only selected ⅓-octave bands of random noise to the system. The sound pressure-level meter is positioned in the midaudience region, preferably just off the center axis of the audience area preferably extending perpendicularly away from the reproducing devices. A ⅓-octave band near 1,000 Hz. is selected on the meter, and the gain of the system is adjusted to produce an 85–90 db. sound pressure-level at the meter. The output of the random-noise generator is varied in ⅓-octave bands across the audio spectrum, and the sound pressure level in each band is read on the meter. The recorded readings taken for each band provide the data for plotting the house-curve. It has been discovered that, for most cases, these readings need only be taken in ⅓-octave bands from 80 Hz. to 10,000 Hz., for sound system limitations and the natural reductions of energy in the spectrum portions beyond these points combine and, as a result, the responses in these regions usually do not require adjustment.

Figure 6:
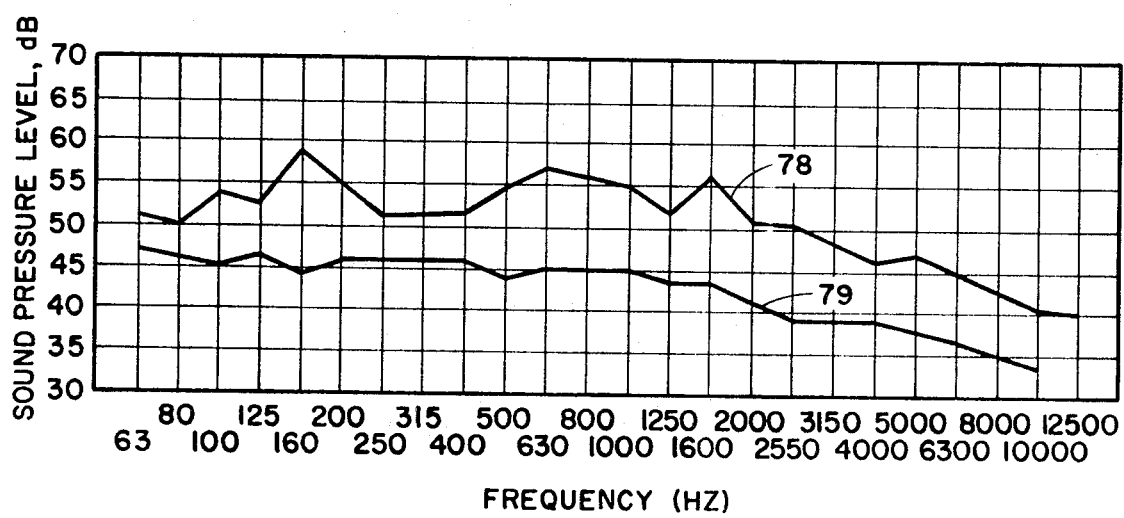
FIG. 6 is a graph illustrating improvement to be achieved, in accordance with this invention, in the sound in a room.

The above procedure results in the measuring of the pressure-levels of the sound at substantially equally spaced intervals across at least a portion of the audiofrequency spectrum to produce a sound pressure-level versus frequency curve for the room. The readings taken above can be plotted to produce a room characteristic, such as curve 78 (FIG. 6), and this characteristic can be analyzed to find the increased pressure-level bands which must be smoothed. Identifying these bands makes possible the varying of the attenuation of each respective filter as necessary to form a composite, electrical filter-response curve which is substantially the inverse of the acoustical sound pressure-level response curve of the room. It is an important advantage of the invention that it permits the saving of much time and expense in that attenuation can be inserted at a filter or at a combination of filters each having a center frequency in the vicinity including the center frequency of a respective increased pressure-level band or peak appearing in the house-curve. In this manner, good, composite filter-response curve is produced and the requisite degree of room-smoothing is accomplished. This technique is particularly adaptable where a wave-analyzer is available for dynamically producing the house curve. It is possible to take a first response curve for a sound system while the system operates in an anechoic chamber, then take a second response curve while the system operates in a room; and the first curve can be compared to the second to eliminate precisely the distortions induced by resonances established by the room. A more practical technique is readily available, however; for signal power levels in the linking circuit or between the amplifier and speaker are proportional to the sound pressure-levels of sound produced in an anechoic chamber. Thus, the power levels of electrical signals provide another standard of comparison by which the degree of distortion of the sound in the room by room resonance can be measured.

Loudness is a subjective quantity which depends only partially on sound-pressure level and depends significantly on the workings of complex and imperfectly understood physiological and psychological processes. In defining loudness, hence, the sound-pressure level of a tone of standard pitch and harmonic content is taken as a reference, and the loudness of any other tone is placed, by the judgment of a listener, in terms of whether it is half as loud as the standard tone, of equal loudness, etc. Since the frequency response of human ears are not flat loudness varies widely when pitch is changed and sound-pressure level is kept constant. The significance of another, extremely important loudness-determinant, however, has not been recognized. This determinant is that of bandwidth; and broadband sounds tend to be perceived as much louder than pure tones or narrowband sounds of the same sound-pressure level. Further, it has been discovered that the bandwidth of a narrowband sound may be gradually increased, up to a point, without any subjective change in loudness; but, as the bandwidth is increased beyond that point, subjective loudness increases somewhat proportionately to the increase in bandwidth, there being at no time any increase in sound-pressure level. This point at which the loudness level begins to increase marks the limit of what will be referred to hereinafter as the critical bandwidth. Meanwhile, the pressure-level of sound having a bandwidth less than the critical bandwidth is susceptible of considerable variation which does not cause a loudness change apparent to a listener.

A study of the critical bandwidth phenomenon has shown that sounds located in different portions of the audio spectrum have different critical bandwidths, measured in terms of frequency, but that the critical bandwidth is approximately one-third octave at each frequency investigated. Thus, the audiofrequency spectrum may be divided into segments that are approximately one-third octave or less in breadth; and (subject only to filter limitations discussed later) whole bands are treated to smooth the house-curve to the desired shape, and this is fully possible without undesirably affecting the subjective loudness of the sound. It thus is possible to treat at one time all the resonance modes within the critical bandwidth covered by one filter. Thus, the bandwidth of each filter is approximately one-third octave, measured between the points where the filter attenuation is one-half its maximum value. It is highly important that there is a quite substantial overlap of the less than one-half attenuation portions of the bandwidths of filters of neighboring center frequencies, for this makes possible a smooth and continuous shaping of the response curve of the sound system until the inverse of the house-curve is fully obtained. For illustration of the above-described relation between adjoining filters, refer to FIG. 8, wherein one-half attenuation point 90 of the attenuation response curve 81 of one filter is simultaneously one of the one-half attenuation points of the adjoining attenuation response curve 92. Similarly, the one-half attenuation points of curves 81, 93 coincide at 91.

After smoothing of the house-curve possible has been accomplished, additional adjustment of sound pressure-levels may be required where a sound reinforcement system is involved. First, consider FIG. 7, wherein the results of the smoothing of the house-curve are illustrated. The room-response curve 72, evidencing resonance-induced distortion, is attenuated by a plurality of filters of no more than critical bandwidth and having a composite response-curve represented by curve 73 to thus produce the smoothed house-curve 74. At this point, the quality of the sound is excellent, but the acoustic gain of a sound-reinforcing system will not necessarily be high; for feedback-induced oscillations can still occur where the gain is sought to be increased toward the maximum of the system. Therefore, after the initial smoothing is completed, the gain of the system is raised until feedback occurs, and further adjustment of critical-frequency bands is then accomplished to eliminate feedback oscillations. If a feedback frequency falls exactly between the center frequencies of two filters attenuation is equally added at each of these filters in the manner just described until the feedback stops.

One additional tuning step may be required for sound reinforcement systems. Most microphones have an increased tendency to feed back as their coupling to sound in the room is increased at certain frequencies by bringing the microphone into close association with a body which is large with respect to the microphone. Sound waves are reflected by such body and received by the microphone, and a changed set of conditions stimulating regenerative feedback is created. Oscillations caused by such a proximity are treated and eliminated in the same manner as are room-feedback frequencies.

Once the tuning of a sound system to a room is completed, a substantial improvement in the quality of sound in the room is apparent, and sound reinforcement systems tuned in accordance with this method are free of premature regenerative feedback oscillations. Because the method is simple and easy to apply and may be applied quickly and accurately, sound systems in auditoriums previously requiring days of tuning time merely to eliminate regenerative feedback have in 2 hours been adjusted not only to eliminate feedback, but also to achieve a substantial improvement in the general quality of the sound.

An example of the "wave-analyzer" mentioned previously is that marketed by the Hewlett-Packard Corporation and designated as their Model 8054A. With such a device, measuring the house-curve is greatly expedited, with the result that a sound system can be adjusted to a room in as little as 10 to 15 minutes.

FIG. 2 illustrates a band-rejection filter for use in the linking circuit 13 of the sound system shown in FIG. 1. A plurality of the band-rejection filters 27 are connected in series in the linking circuit 13, and each filter includes an inductor 30 connected in series in the signal-path provided by the linking circuit. A capacitor 29 is connected in parallel with the inductor 30, and a resistor 28 is connected in one branch of the filter, either in series with (as shown) the inductor 30 or with the capacitor.

FIG. 3 illustrates another filter useful in the linking circuit 13 and is desirable because of its constant-impedance feature, further discussed below. This filter is a band-rejection filter of the type known as the bridged-T, constant-K filter and is particularly useful in a bridged network where the members of a plurality of filters are used in series, for the filter insertion-loss is minimized by this design. The filter of FIG. 3 includes an antiresonant portion 33 and resonant portion 34. The antiresonant portion 33 includes a capacitor 35 connected in the conductor A of the linking circuit, an inductor 36 connected in parallel with the capacitor, and a variable resistor 37 connected in parallel with the inductor and the capacitor; thus, the antiresonant portion has a first connection 45 and a second connection 46 and at least three separate paths for current between these two connections. A fixed resistor 38 is connected between connections 45 and 46 and has, at its electrically resistive center, a connection-point 47. The resonant portion 34 of the filter 32 is connected between the connection 47 and the conductor B of the linking circuit 13. The resonant portion 34 includes, in series, a resistor 40, an inductor 41, a capacitor 42, and a variable resistor 43. The variable resistors 43, 44 are coupled together by a mechanical linkage C and are variable together, but in electrically opposite directions: when resistor 43 is set at its maximum-resistance value, resistor 44 is at its minimum-resistance value. Each variable resistor 43, 44 is substantially linear within its resistance range and the resistor 43 arrives at its midresistance point simultaneously with arrival of the resistor 44 at its midresistance point; when resistor 43 is at its minimum value, resistor 44 is at its maximum value.

FIG. 4 depicts an active filter 48, for use in the linking circuit 13, which comprises three portions: an emitter-follower input portion 49, a twin-T filter portion 50, and an output-control portion 51 which includes an emitter-follower output circuit and a variable resistor 71 for adjusting the amount of attenuation of electrical signals through the filter. The input section includes a transistor 52 such as a 2N2712 or equivalent. The base lead of transistor 52 is connected into one side of the pair of conductive paths A, B of the linking circuit 13. The collector of transistor 52 is connected to a source of positive voltage indicated as B+, and a resistor 53 is connected between the base and collector of transistor 52 in the same manner that a resistor 54 is connected between the base and the emitter. A resistor 55 separates the emitter of transistor 52 from the second conductive path B of the linking circuit 13. The twin-T filter portion 50 comprises capacitors 56 and 57 connected in series and two resistors 58 and 59 which are connected in series to form a pair connected in parallel with the series-connected capacitors 56, 57 through a first connection-point 62 located between capacitor 56 and resistor 58, which connection-point 62 is connected to the emitter of transistor 52 by a lead 63. There is a terminal 64 between the capacitors 56 and 57 a terminal 65 between resistors 58 and 59, and a connection-point 67 between capacitor 57 and resistor 59.

The output-control section 51 comprises a transistor 66 having a base connected to junction 67 on the twin-T filter portion 50. The emitter of transistor 66 is connected, through two series-connected resistors 68, 69, to conductor B of the linking circuit. The collector of transistor 66 is connected to the source of positive voltage. A resistor 61 is connected between the twin-T network 50, at terminal 64, between capacitors 56 and 57 and a connection point 71 located between resistors 68 and 69; similarly, a capacitor 60 is connected between the twin-T network connection point 65 and the emitter of transistor 66. A variable resistor 61 is connected between the emitter of transistor 52 and the emitter of transistor 66; and the wiper of this variable resistor connects to the output terminal of the filter 48. Successive filters such as 48 may be connected in series in the linking circuit 13 to produce the plurality of filters 15 (FIG. 1) required for use in accordance with this invention.

The respective sizes of the capacitor 29 and the inductor 30 (FIG. 2) are chosen such that each has maximum capability of resonance about a center-frequency lying within a ⅓-octave band as defined above, the center frequencies of each being the same. Within this band, the current in the inductive branch of the circuit tends to lag the voltage of that branch by 90°, while in the capacitive branch, the current leads the voltage by 90°. *the currents in* R branches of the circuit and in a given direction are 180° apart; at a given instant, the currents are equal and opposite and tend to cancel each other. As a result, the circuit presents a very high impedance to currents within the band extending on each side of the center frequency and flowing in the linking circuit 13.

The selectivity of a parallel resonant filter circuit is inversely proportional (and its bandwidth is directly proportional) to the resistance in the filter circuit. Filters previously used to attenuate electrical signals in the linking circuits of reinforcement sound systems have been very selective, low-resistance, narrowband filters employed to eliminate system oscillation caused by regenerative feedback. Such filters, as previously mentioned, introduce spurious signals into the linking circuit. The "Q" of a resonant circuit is defined as $Q=X_L/R$ where $X_L$ is the inductive reactance of the resonant circuit and R is the resistance of the circuit. Because the resistance of a narrowband filter is very low, its "Q" is very high. While the filter attenuates signals at one frequency, it is subject to internal oscillation at other frequencies. The duration of such an oscillation beyond the cessation of a signal that occasioned it is proportional to the resistance of the filter; for the energies involved must be dissipated before the oscillation will stop. The voltage across the filter (hence, in the linking circuit) rises and falls with the oscillatory transfer of energy between the respective branches. As energy is lost in successive cycles of oscillation because of the presence of resistance, the amplitude of the oscillation decreases to zero. Where the filter circuit resistance is low, such decrease is gradual, and when the oscillation is sustained for approximately 50 milliseconds, as at 85 in FIG. 12, it is audible and of itself becomes a distortion and falsification of the original sound material. The resistor 28 (FIG. 2) lowers the Q of the filter circuit to a point at which oscillations of the filter are too brief to be audible, and it broadens the bandwidth of the filter to enable it to operate on a band, not an isolated frequency. The value of the resistor 28 is chosen, in conjunction with the values of the capacitor 29 and the inductor 30, to set the effective bandwidth of the filter at approximately one-third octave. The resistor 28, therefore, provides a means for reducing the decay time of oscillations at each electrical filter in the linking circuit to improve the fidelity of the acoustical output of the sound system.

Figure 12:
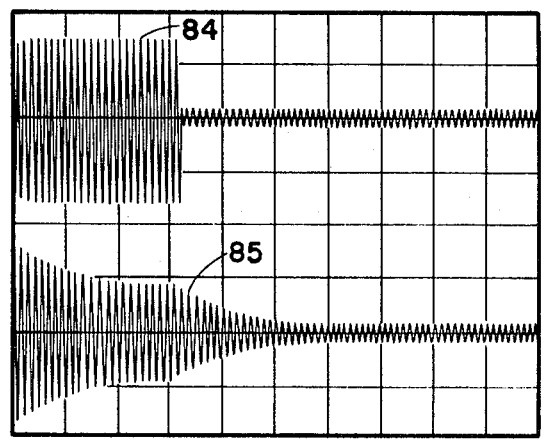
FIGS. 12 and 13 represent oscilloscope presentations each showing a test signal and the result of the application of that test signal to various filters under different conditions.
Figure 13:
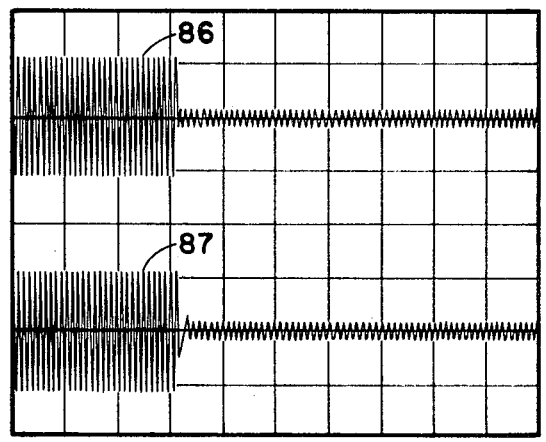

By way of illustration of the above, refer to FIG. 12, where a test-signal burst 84 of 1,000 Hz. energy is fed to a narrowband filter having a Q of approximately 20. The signal output 85 of the filter oscillates for approximately 50 milliseconds (the oscilloscope sweep is set for 10 milliseconds per centimeter). In FIG. 13, a similar test-signal burst 86 is applied to filter of the type illustrated in FIG. 2, and the signal output 87 of the filter has only a negligible oscillation, period of less than 5 microseconds, which oscillation is not audible.

Figure 8:
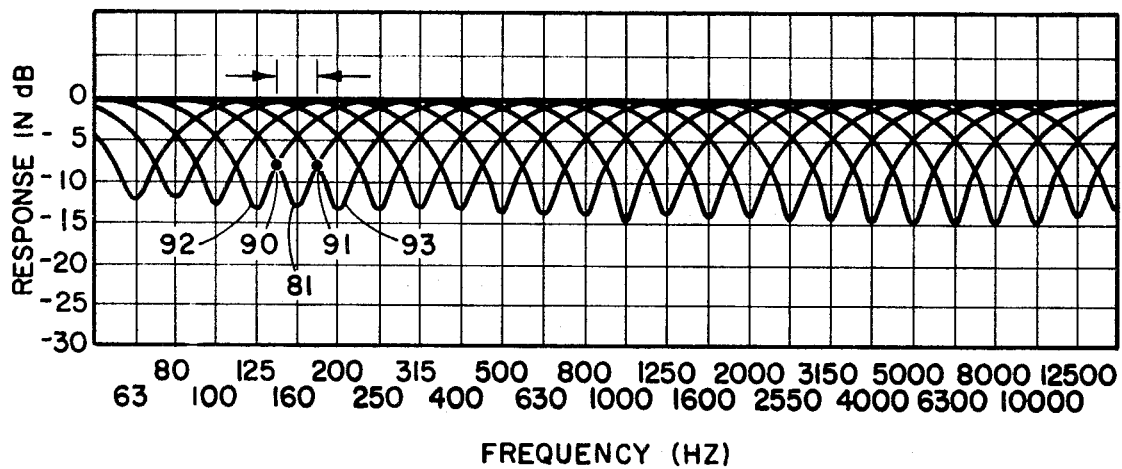
FIG. 8 is a graph showing the electrical response of each of 24 separate filters of the types shown schematically in FIGS. 2 and 3 and arranged in the sound system in accordance with this invention.

Means connected to each filter circuit for variably controlling the amount of attenuation of electrical signals within the frequency band to which the respective filter is tuned is provided, in the circuit shown in FIG. 2, by the variable resistor 31. When the resistance of resistor 31 is set to a very high value, no current passes through it and the maximum attenuation of currents within the band of rejection of the filter is at a maximum. To reduce the attenuation, the resistance of the resistor 31 is reduced, thus allowing passage of a proportionate amount of current within the attenuated band. In a preferred embodiment, the resistor 31 is variable in 14 successive steps each adding approximately 1 db of attenuation. In a representative application, 24 filters of this type are series-connected in the linking circuit 13, the center frequencies of the filters ranging from 63 Hz. to 12,500 Hz. FIG. 8 illustrates the spacing of the filters at ⅓-octave intervals and shows an individual response-curve, such as 81, for each filter when set at maximum attenuation. FIG. 8 does not show the resultant response curve for the filters produced by interactions between the filters.

The filter of FIG. 2 is subject to at least one limitation in that the impedance of a linking circuit including a plurality of such filters constantly changes, depending upon the presence or absence of sound material of frequencies falling within the attenuation bands of the various filters. In addition to creating linking circuit losses, this arrangement may, in extreme cases, cause system oscillation which displays the same characteristics as regenerative feedback. The filter 32, shown in FIG. 3, provides a solution to this problem. The antiresonance portion 33 of this filter is substantially the same, in function and operation, as the filter 27 of FIG. 2. There is added to the filter 33 (FIG. 3), however, a resonant filter db. 34 which has the same center frequency as the band-rejection portion 32. The filter 33 provides a means for maintaining, for the linking circuit 13, an impedance that is free of variation caused by the number of filters that are used and by the attenuation introduced by each respective filter. The passband portion 34 provides a certain impedance to filter-current of the frequency of resonance in the linking circuit 13 while the band-rejection portion 33 provides a complementary impedance to current flow down the signal path; thus, the resistance to current flow is constant at all times. Means for variably controlling the amount of attenuation of electrical signals in the linking circuit 13 comprises the linked, oppositely variable resistors 43, 44 for controlling the attenuation of electrical signals within the band of attenuation and to provide a constant impedance for the linking circuit 13. With the first resistor 44 set at its maximum value, essentially no currents within the band passes the band-rejection filter portion 33 and reaches the amplifier. As the resistance of first resistor 44 is lessened toward a lower value, such currents can increasingly pass to the amplifier. When resistor 44 is at a high value, resistor 43 is at a low value and presents very little resistance to currents within the band of attenuation of the filter. As the resistance of resistor 43 is increased, the currents within the attenuation band flowing into junction 45 are proportionately divided; thus, the amount of such currents that is allowed to pass to the load is controlled in precise amounts, and the impedance to current of that frequency is maintained constant. The values of each of the resistors 38 and 39 is chosen to equal the terminal impedance of the network. Resistor 37 limits the reduction of current to the lead via the antiresonant path 33 and resistor 43 limits current from the signal source via the resonant circuit 34. The combination of resistors 38, 39, 40, 43 and resonant elements 41 and 42 in the shunt path in combination with resistor 37 and resonant elements 35 and 36 in the antiresonant portion combine to make the terminal impedance of the network constant at all frequencies. The filter of FIG. 3 is of a type known in the filter art as a bridged-T, constant-K filter.

Figure 9:
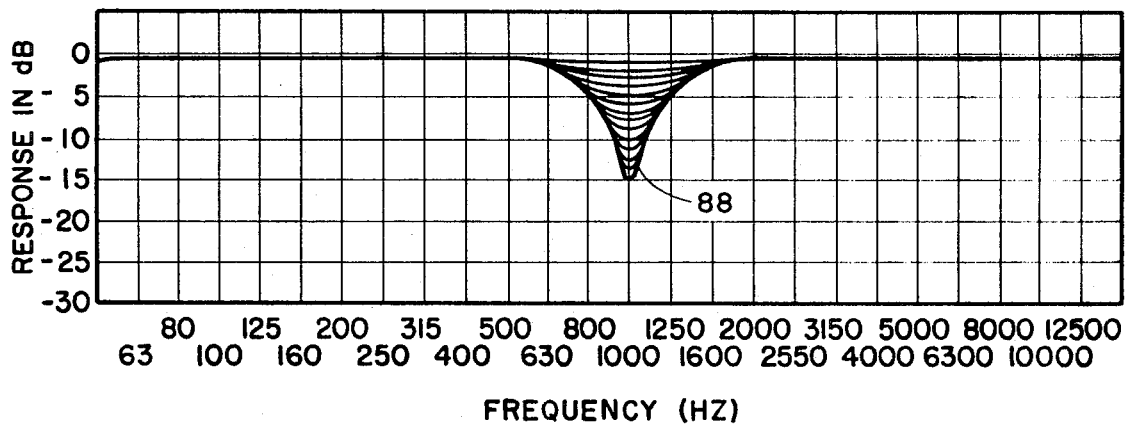
FIG. 9 is a graph representing the variable attenuation in distinct steps of a single filter of the type illustrated in FIG. 3.
Figure 10:
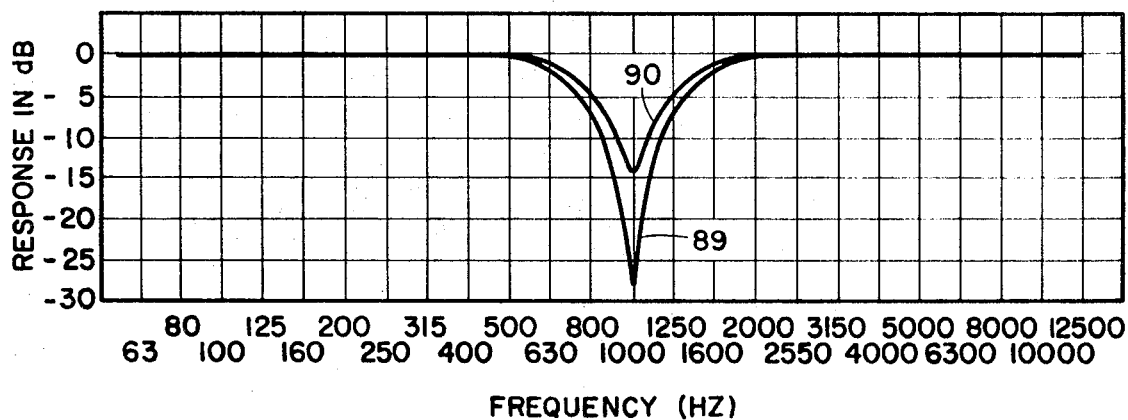
FIG. 10 is a graph providing representations of the maximum attenuation produced jointly by two filters of the type shown in FIG. 3 when tuned to the same center frequency and connected in series in the sound system, and of the maximum attenuation of a single filter of the same type tuned to the same center frequency.

FIG. 9 shows a response curve for the filter of FIG. 3 and illustrates the variable-attenuation feature of the filter. Curve 88 represents the maximum attenuation produced by a 1,000 Hz. filter and shows 14 finite, 1-db. steps that can be utilized for varying attenuation simply by simultaneously varying the values of the resistors 43 and 44 (FIG. 3).

Where it occasionally is necessary to use more than 14 db of attenuation at the frequency band of a given filter, there is inserted into the linking circuit an additional filter of the same center frequency. The attenuation of the db. filter adds to that of the first to provide the extra attenuation required. A filter-response curve 89 illustrating the additional attenuation made possible by substantially identical filters arranged in this fashion is shown in FIG. 10. By comparison, the response curve 90 is that of a single filter set at maximum attenuation.

Figure 11:
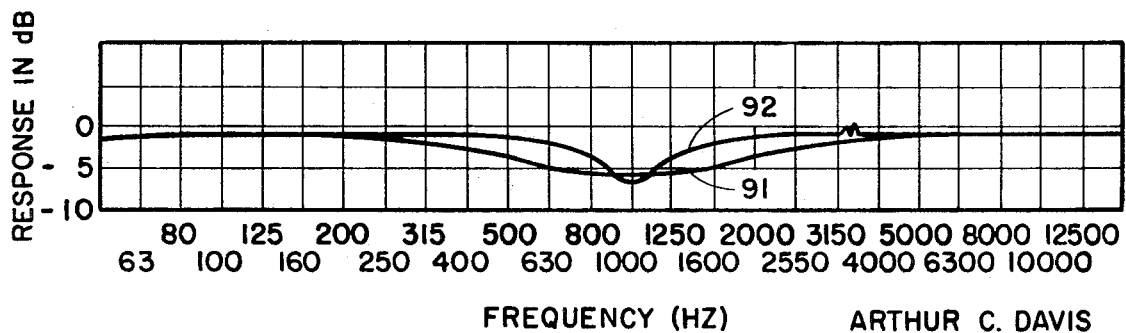
FIG. 11 is a graph providing a comparison between the response curve resulting from the interaction of three filters of the type shown in FIG. 3 with that of a single filter.

FIG. 11 provides an illustration of the result of interaction between three respective filters, such as that of FIG. 3. The curve 91 represents the composite attenuation of three filters each having its center frequency at, respectively, 800, 1,000, and 1,250 Hz. and set for 2 db. of attenuation. For comparison, curve 92 illustrates the response of a single filter having frequency of 1,000 Hz. and set for 6 db. of attenuation. As will be noted, curve 91 is much the smoother.

A third type of filter for use in the linking circuit 13 and providing additional advantages is the active filter. The filters of FIGS. 2, 3 result in insertion losses in the linking circuit 13 of approximately 2 db. per filter. The active filter of FIG. 4 and the filter of FIG. 3 provide only a negligible insertion-loss. Additionally the filter of FIG. 4 is much more compact for it eliminates the large and expensive coils of the other filters; thus, a substantial reduction in size, weight, and expense is realized. Additionally the emitter-follower input section 49 effectively isolates the filter portion 50 from the transmission line; hence, "ringing" in this filter is not a problem, though the filter of FIG. 4 is effectively a low-Q filter. Further, the impedance of the filter 48 is constant, because the input impedance of the emitter-follower input section 49 is constant regardless of frequency; hence, the problems previously described in that regard with respect to other filters are avoided. Still further, since this filter design does not present a ringing problem in the linking circuit 13, the bandwidth of the filter can be narrowed, if for some reason this should be desired, without introducing "ringing" into the sound. As an example, it is possible to space the active filters one-sixth octave apart across at least a portion of the audiofrequency spectrum.

An electrical signal in the linking circuit 13 applied to the base of transistor 52 is converted by the transistor from a voltage signal at the base to a current signal at the emitter for application to the filter portion 50. The signal of the emitter of transistor 52 is received by and divided at junction 82. A first portion of the current passes via the lead 63 to the filter portion 50, which is a twin-T, band-rejection filter of a type well known in the art and having an output to the base of transistor 66, which transistor is also connected as an emitter-follower. Again, as with transistor 52, the impedance to the current at the base of the transistor 66 is high and the signal at the emitter of transistor 66 is a current signal of substantially the same amplitude as the amplitude at the base of transistor 52 but having currents within the filter bandwidth removed. The value at which the variable resistor 71 is set determines the attenuation of current within the bandwidth and appearing at the output terminal. Current from the emitter of transistor 52, which current is not filtered and contains currents within the filter bandwidth, and filtered current from the emitter of transistor 66 are applied respectively to opposite ends of resistor 71. If the wiper of resistor 71 is moved to a first end of the resistor 71, current from the emitter of transistor 66 encounters very little resistance in flowing to the output terminal, while the current from the emitter of transistor 52 has a very high resistance path to the output terminal; thus in this position, substantially no unfiltered current appears at the output terminal. If the wiper is moved to the opposite end of resistor 71, current from the emitter of transistor 52 is passed directly to the output terminal and currents of frequencies lying within the bandwidth of the filter portion 50 passes without attenuation. When the wiper of resistor 71 is placed at any position intermediate the ends of the resistor, currents from the emitter of transistor 52 and the emitter of transistor 66 are added in the output in inverse proportion to the amount of resistance of resistor 71 appearing on each respective side of the wiper. Thus, all or any portion of the currents within the filter bandwidth can be removed from the output. For rapidity and precision of adjustment, the resistor 71 preferably is variable in approximately 1 db. steps, as with the filters shown in FIG. 2 and FIG. 3.

It is apparent that other variations and modifications may be made without departing from the present invention. Accordingly, it should be understood that the forms of the present invention described above and shown in the accompanying drawings are illustrative only and not intended to limit the scope of the invention.

What is claimed is:

1. For eliminating undesired distortion effects produced by reverberations from structure on the quality of sound over a predetermined audiofrequency spectrum produced by a system which is operated in association with the structure and which has a signal source, an amplifier, a linking circuit connecting the signal source and amplifier, and a sound-reproducing device driven by the amplifier, the combination with the signal source, linking circuit, and amplifier comprising:
  a plurality of electrical, band-rejection filters located in series in the linking circuit and each having a respective center frequency lying within a band in which it attenuates electrical signals, said bands overlapping each other to provide a continuous attenuation pattern across said predetermined audiofrequency spectrum, the center frequencies of the respective filters being substantially equally spaced by a fraction of an octave across said audiofrequency spectrum; and
  means connected to each filter for variably controlling the amount of attenuation of electrical signals within the frequency band to which the respective filter is tuned to minimize said distortion effects over said entire predetermined audiofrequency spectrum.

2. The combination claimed in claim 1 wherein the respective center frequencies of said band-rejection filters are spaced one-third octave apart across at least a portion of the audiofrequency spectrum.

3. The combination claimed in claim 1, wherein the frequencies at which the attenuation produced by each filter is one-half its maximum value are approximately in coincidence with frequencies at which at least one filter of immediately adjacent center frequency produces one-half its maximum attenuation.

4. The combination claimed in claim 1 wherein at least a portion of the band-rejection filters are active filters having active components.

5. The combination claimed in claim 4 wherein at least some of the band-rejection filters are spaced one-sixth octave apart across at least a portion of the audiofrequency spectrum.

6. The combination claimed in claim 1 wherein each band-rejection filter has a circuit comprising:
  a coil connected in series in the linking circuit between the signal source and the amplifier;
  a capacitor connected in parallel arrangement with the coil and tuned with the coil in a respective frequency of resonance for attenuating electrical signals within a band including the tuned frequency; and
  means in the filter circuit for reducing the decay time of oscillations within said band of the filter to improve the fidelity of the acoustical output of the sound system.

7. The combination claimed in claim 6 wherein the means for reducing the decay time of oscillations comprises a resistor connected in the filter circuit and in series with the coil and wherein the value of said resistor is selected in conjunction with the values of the capacitor and the coil to establish a bandwidth, at the point corresponding to one-half of the maximum attenuation of the band at the center frequency thereof, of substantially one-third octave.

8. The combination claimed in claim 6 wherein the means for reducing the decay time comprises a resistor connected in the filter circuit in series with the capacitor.

9. The combination claimed in claim 1 wherein the means for variably controlling the amount of attenuation of electrical signals comprises a variable resistor connected in parallel with each filter.

10. The combination claimed in claim 1 and further comprising means for maintaining, for the linking circuit, and impedance that is substantially free of variation caused by any variation in the number of filters that are used and by any variation in the attenuation of each respective filter.

11. The combination claimed in claim 10, wherein the linking circuit comprises at least two electrically conductive paths and the means for maintaining a constant impedance comprises at least one bandpass filter portion for operating in association with each band-rejection filter to short filter-current of frequencies lying within said band in which electrical signals are attenuated across the linking circuit, and wherein the means for variably controlling the amount of attenuation comprises a first variable resistor in parallel connection with the band-rejection filter and a second variable resistor in series connection with the bandpass filter, said first and second variable resistors being linked and variable together to control the attenuation of signals within said band in which signals are attenuated and to provide a constant impedance for the linking circuit.

12. For eliminating undesired effects produced by resonances induced by structure-forming and contained in a room on the quality of sound over a predetermined audiofrequency spectrum produced in the room by a system having a signal source, an amplifier, a linking circuit connecting the signal source and amplifier, and a sound-reproducing device driving the atmosphere within the room to produce said sound, the method comprising:
  measuring the pressure-level of said sound at intervals spaced across said predetermined audiofrequency spectrum to produce a sound pressure-level versus frequency curve for the room; and
  selectively attenuating, within a plurality of contiguous frequency bands covering said spectrum, electrical signals in the linking circuit to compensate the sound pressure-level versus frequency characteristics of the sound produced in the room to cause said characteristics to correspond to a curve which is essentially smooth over said predetermined frequency spectrum.

13. The method claimed in claim 12 wherein the step of measuring the pressure-level of said sound is accomplished by analyzing sound in the room to provide a dynamic sound pressure-level versus frequency curve for the room.

14. For eliminating undesired effects produced by resonances induced by structure-forming and contained in a room on the quality of sound over a predetermined audiofrequency spectrum produced in the room by a sound-reinforcing system having a microphone, a signal source, amplifying means, a linking circuit a plurality of contiguous electrical band-rejection filters located in series and connecting the signal source and amplifying means, and a sound-reproducing device driven by electrical signals from the amplifying means to drive the atmosphere within the room to produce said sound, the method comprising:
  measuring the pressure level of said sound at intervals spaced across said predetermined audiofrequency spectrum to produce a sound pressure-level versus frequency curve for the room;
  selectively attenuating, across said frequency spectrum, electrical signals in the linking circuit to produce an attenuation versus frequency curve which is substantially the inverse of the sound pressure-level curve for the room; and
  selectively altering electrical signals in the linking circuit to eliminate any regenerative feedback in the reenforcement system caused by acoustical coupling between the sound in the room and microphone.

15. The method claimed in claim 14 including the further step of selectively attenuating electrical signals in the linking circuit to eliminate regenerative feedback in the reenforcement system caused by placement of a body of large size with respect to the microphone in close association with the microphone.

16. For use in connection with a sound system having a signal source, amplifying means, a linking circuit connecting the signal source and the amplifying means, and a sound-reproducing device driven by signals supplied thereto by the amplifying means to produce sounds over a predetermined audiofrequency spectrum and operating in association with the structure forming and in a room which acts on said sounds to produce undesired variances in pressure-levels therein with respect to the power levels of the signals supplied to the sound-reproducing device, the method for adjusting the sound pressure-level versus frequency characteristics of the reproduced sound to improve the quality thereof comprising:

measuring the sound pressure-level versus frequency characteristics of sound in the room at intervals spaced across said predetermined audiofrequency spectrum; and selectively attenuating, within contiguous bands having different center frequencies and covering said frequency spectrum, electrical signals in the linking circuit to alter the sound pressure-level versus frequency characteristics of the sound produced in the room to cause said characteristics to correspond to a curve which is substantially smooth over said entire frequency spectrum and to provide a balance of sound pressure-levels in the reproduced sound having a desirable correspondence to the balance of power levels of the signals supplied to the sound-reproducing device.

17. The method claimed in claim 16 wherein electrical signals are selectively attenuated to alter the sound pressure-level versus frequency characteristics of the sound produced in the room to provide a balance of sound pressure-levels in the reproduced sound which emphasize selected portions of the reproduced sound material.

18. For use in connection with a sound system having a signal source, an amplifier, a linking circuit connecting the signal source and the amplifier, a plurality of variable-attenuation, band-rejection filters for attenuating electrical signals in contiguous frequency bands covering a predetermined portion of the audiofrequency spectrum, and a sound-reproducing device driven by signals supplied thereto by the amplifier to produce sounds and operating in association with the structure-forming and in a room which acts on said sounds produced by the sound system to produce undesired variances in pressure-levels therein with respect to the power levels of the signals supplied to the amplifier, the method for adjusting the sound pressure-level versus frequency characteristics of said sounds to improve the quality thereof comprising:

measuring the pressure-level of sound in the room at intervals spaced across at least a portion of the audiofrequency spectrum to produce a sound pressure-level versus frequency curve for the room; and varying the attenuations of selected ones of the plurality of band-rejection filters to produce a composite electrical attenuation versus frequency filter-response curve which is substantially the inverse of the acoustical sound pressure-level versus frequency response curve of the room, such that selected bands of electrical signals in the linking circuit are attenuated to produce a sound pressure-level versus frequency response curve for the room that is substantially smooth over said audiofrequency spectrum.

* * * * *